Nov. 3, 1959  H. F. KUHNHAUSEN  2,910,875
POWER TRANSMITTING MECHANISM
Filed Feb. 2, 1956  2 Sheets-Sheet 1

INVENTOR.
HERMAN F. KUHNHAUSEN
BY

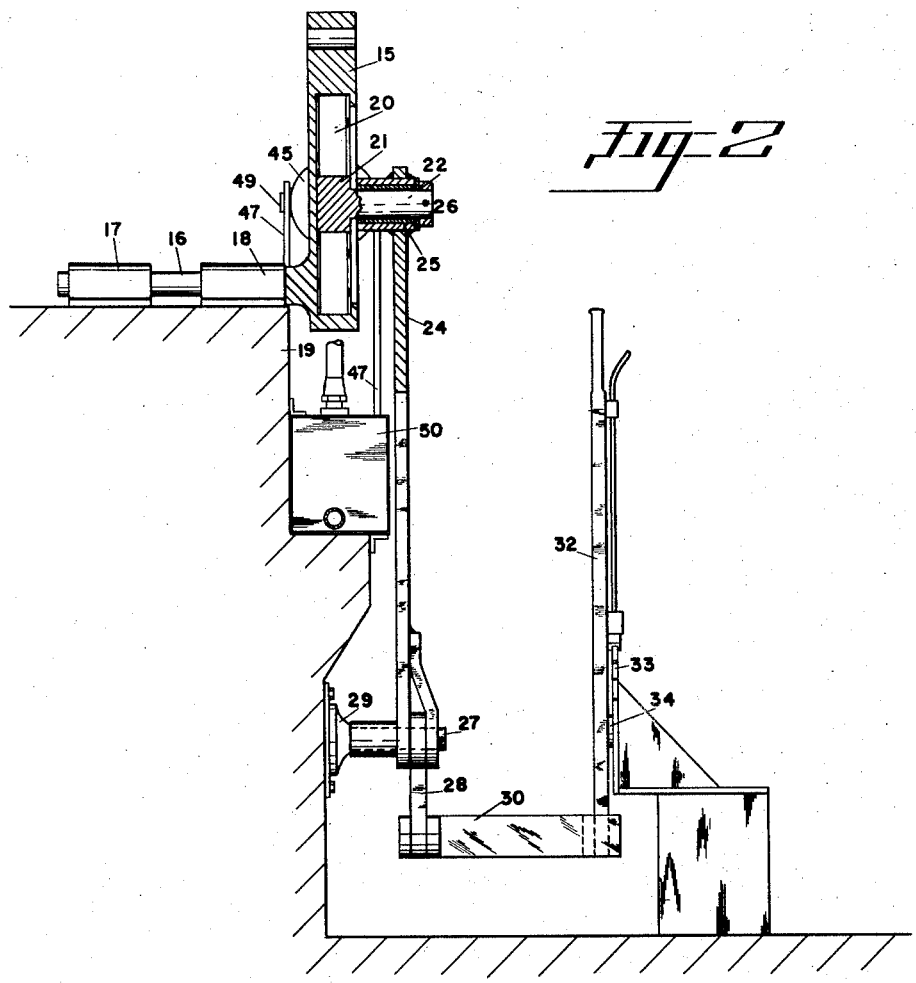
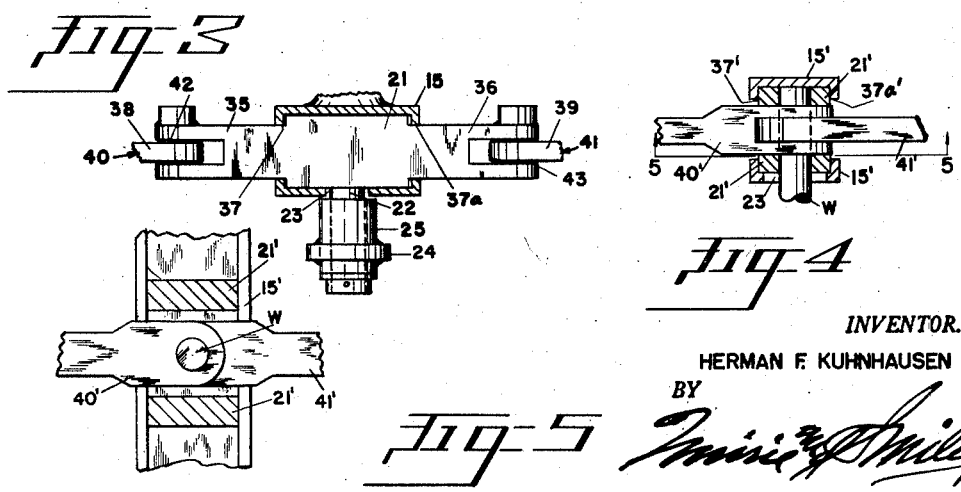
INVENTOR.
HERMAN F. KUHNHAUSEN

2,910,875

POWER TRANSMITTING MECHANISM

Herman F. Kuhnhausen, Glenwood, Wash.

Application February 2, 1956, Serial No. 563,093

1 Claim. (Cl. 74—40)

This invention relates generally to power transmitting mechanisms and pertains more particularly to an improved fluid drive system.

A primary object of this invention is to provide an improved fluid drive mechanism wherein a smooth and continuous flow of power is transmitted from a rotating member to a fluid motor.

Another object of this invention is to provide a fluid drive mechanism and power transmitting means particularly adapted for use in automotive work wherein no lost motion or slippage of the primary source of power is encountered.

Still another object of this invention is to provide an improved power transmitting mechanism having variable torque characteristics wherein the variations in the torque transmitted can be accomplished continuously and evenly.

A further object of this invention is to provide an improved power transmitting mechanism incorporating a power driven fly wheel having a connecting rod eccentrically connected thereto and extending therefrom to a fixed oscillatable crank arm and wherein fluid motor means are variably driven from such crank arm.

A still further object of this invention resides in the provision of an assembly in conformity with the foregoing object wherein the fluid motor means is so connected to the crank arm as to have variable ratio drive connection therewith which may be altered or varied in any desired time in a smooth and continuous manner.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Fig. 2 is a vertical section taken substantially along the plane of section line 2—2 of Fig. 1;

Fig. 3 is an enlarged, horizontal section taken substantially along the plane of section line 3—3 of Fig. 1;

Fig. 4 is a view similar to Fig. 3 but showing a modified form of construction, and Fig. 5 is a vertical section taken substantially along the plane of section line 5—5 of Fig. 4.

Figure 1:
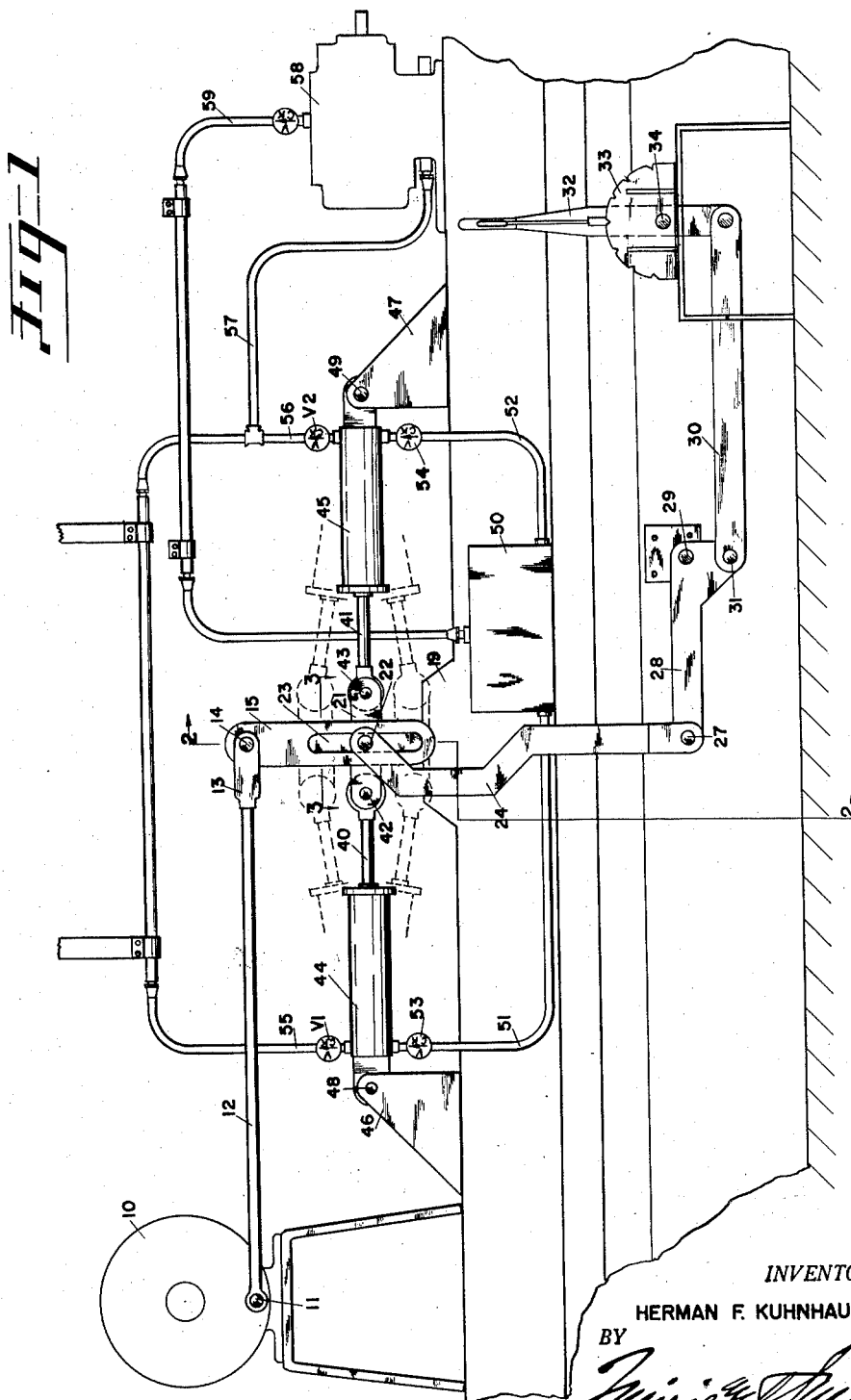
Fig. 1 is a view of the improved power transmitting mechanism.

Referring particularly to Fig. 1, the reference numeral 10 indicates generally a fly wheel which is driven by any suitable means of power, such as, for example, an internal combustion engine or the like. Eccentrically connected by means of a pivot pin 11 to this fly wheel is a connecting rod member 12 and the opposite end of this connecting rod is provided with a suitable connection such as the clevis member 13, pinned as at 14, to the upper end of a crank arm member 15. As is shown most clearly in Fig. 2, the crank arm 15 has provided at its lower end a laterally offset pivot shaft 16 journaled in suitable bearings 17 and 18 connected to the base 19 of the assembly.

The interior of the crank arm is hollow, as is shown most clearly in Fig. 2, to provide a chamber 20 within which the cross head member 21 is vertically movable. The cross head is provided with a projecting crank pin 22 which extends through a vertically elongate slot or opening through one wall of the crank arm 15, such slot being indicated by reference character 23 in Fig. 1.

A control link 24 is provided at its upper end with a boss or sleeve portion 25 having a bearing 26 therein rotatably receiving the crank pin 22. The lower end of the control link 24 is pinned, as at 27, to a bell crank member 28 pivotally mounted, as by the pin 29, to the base 19. A drag link member 30 is also pinned, as at 31, to the bell crank and, at its opposite end, to the lower end of a control handle member 32 associated with and pivotally mounted on a control quadrant 33 by means of the pivot pin 34. By this construction, it will be readily apparent that as the control handle 32 is moved back and forth over the quadrant 33, the cross head 21 will be moved vertically within the chamber 20 of the crank arm 15 so as to be shifted further or closer to the pivot axis of such crank arm.

As shown most clearly in Fig. 3, the cross head 21 also has opposite side projections 35 and 36 which extend outwardly of the crank arm through elongated openings 37 and 38 in the opposite sides thereof. Each of such extensions 35 and 36 terminate in bifurcated end portions receiving therebetween the free end portions 37a and 39 of a pair of piston rods 40 and 41.

Each piston rod is connected to its associated extension 35 and 36 by means of a suitable wrist pin such as those indicated by the reference characters 42 and 43. Each piston rod is associated with a cylinder assembly 44 or 45 having its end opposite from that which the piston rod extends pivotally secured to a suitable mounting bracket 46 or 47, such pivotal connection being attained by virtue of the pivot pins 48 and 49. It will be noted that the pivot pins 48 and 49 are so associated as to permit the cylinders 44 and 45 to be pivotally adjusted in a plane corresponding to the movement of the cross head 21 within the crank arm 15.

Also mounted on the base 19 is a reservoir 50 and interconnecting this reservoir with each of the cylinders, are the inlet lines 51 and 52 which have disposed therein the check valves 53 and 54 permitting fluid flow only in the direction as indicated by the arrows, or, in other words, into the cylinders from the reservoir. Each cylinder has associated therewith an exhaust line 55 or 56 which are commonly connected to an intake line 57 of a suitable fluid motor 58. The exhaust lines are provided with check valves V1 and V2 of the unidirectional type so that as fluid is exhausted from the cylinders, it can flow only to the intake line 57 of the fluid motor 58. Valves V1 and V2 prevent fluid being exhausted from lines 55, 56 and 57 when the pumps 44 and 45 are on their intake strokes, whereas valves 53 and 54 prevent fluid from being exhausted to the reservoir 50 when the pumps are one their exhaust stroke. The fluid motor may be of the vane type or of any other suitable or desired form, and this motor is connected to the means which is desired to be driven. The fluid return line of the fluid motor 58 is indicated by the reference character 59 and will be seen to extend back to the reservoir 50.

As is believed to be clear from the foregoing, it will be seen that as the control handle 32 of the quadrant control is moved back and forth to shift the cross head vertically within the crank arm 15, the cross head will be disposed closer to or farther away from the pivot axis defined by the shaft 16 connected to the crank 15.

Consequently, the stroke applied to the connecting rods 40 and 41 of the piston cylinder assemblies 45 and 46 is varied in accordance with the cross head within the crank arm 15. As the stroke of the piston rods 40 and 41 is shortened, the torque between the internal combustion engine or other suitable power source 10 and the fluid motor 58 is increased, vice versa. Of course, when the cross head 21 is disposed within the crank arm 15 so that the pivot shaft 22 is in alignment with the pivot shaft 16, there will be no motion transmitted from the crank arm to the piston rod 40 and 41 and, consequently, the drive can be described as being in a neutral position. Reversing of the fluid motor 58 can be accomplished by suitable hydraulic controls which would, in effect, reverse the connections to the intake and exhaust lines 57 and 59, providing, of course, that the hydraulic motor or fluid motor is of the reversible type.

By the construction above-described, the variation in torque characteristics as applied from the power source 10 to the hydraulic or fluid motor 58 is of a continuously variable type and there is a positive connection therebetween at all times, except when the control is in the neutral position. Consequently, there is no lost motion or slippage between the power source 10 and the fluid motor 58.

The form of the invention shown in Figs. 4 and 5 is similar in principle to that described above except that the crank arm 15' is constructed in slightly different manner, as is the cross head assembly 21'. In this instance, the crank arm 15' is provided on opposite sides thereof with elongate openings 37' and 37a' through which the interdigitated free end portions of the piston rods 40' and 41' are pivotally interconnected by means of the wrist pin member W which also is journaled in the cross head 21'. This construction is somewhat similar to that shown and described in connection with Figs. 1 and 2 but imposes somewhat less strain on the crank arm due to the coincidental pivotal connection between the piston rods 40' and 41' and the cross head 21'.

Although certain specific embodiments of the invention have been shown and described, it is obvious that many modifications thereof are possible. The invention, therefore, is not to be restricted except insofar as is necessitated by the prior art and by the spirit of the appended claim.

That which is claimed as new, is:

Means for controlling the stroke of the opposed piston rods of a hydraulic pump, comprising a crank arm pivotally mounted at one end to a stationary pivot and reciprocally driven at the other end, pivot means connected to opposing piston rods of the pump and carried by said crank arm for reciprocating the rods, said pivot means being slidable along said crank arm for varying the stroke of the piston rods, a bell crank mounted on a fixed pivot, a link connecting said pivot means to one end of said bell crank, an adjustable control lever, and a second link connecting said control lever with the other end of said bell crank, whereby adjustment of said control lever selectively positions said pivot means on said crank arm to provide the desired stroke to the piston rods.

References Cited in the file of this patent

UNITED STATES PATENTS

| | | |
|---|---|---|
| 692,879 | Lemp | Feb. 11, 1902 |
| 1,172,412 | Salfeld | Feb. 22, 1916 |
| 2,291,011 | Vickers | July 28, 1942 |
| 2,315,114 | Fels | Mar. 30, 1943 |
| 2,493,718 | Chronic et al. | Jan. 3, 1950 |
| 2,548,738 | Orlich | Apr. 10, 1951 |
| 2,627,188 | Gaubatz | Feb. 3, 1953 |
| 2,796,774 | Peed | June 25, 1957 |

FOREIGN PATENTS

| | | |
|---|---|---|
| 121,942 | Great Britain | June 25, 1901 |